(12) United States Patent
Wilson

(10) Patent No.: US 6,408,036 B1
(45) Date of Patent: Jun. 18, 2002

(54) DETECTION CIRCUITS

(75) Inventor: Gordon Wilson, Swindon (GB)

(73) Assignee: Mitel Semiconductor Limited, Wiltshire (GB)

( * ) Notice: Subject to any disclaimer, the term of this patent is extended or adjusted under 35 U.S.C. 154(b) by 0 days.

(21) Appl. No.: 09/134,235

(22) Filed: Aug. 14, 1998

(30) Foreign Application Priority Data

Aug. 22, 1997 (GB) ............................................ 9717826

(51) Int. Cl.$^7$ ............................................... H04L 27/06
(52) U.S. Cl. ........................ 375/340; 375/319; 329/307
(58) Field of Search ................................. 375/317, 319, 375/320, 340, 345, 346; 327/72, 73, 307; 329/349

(56) References Cited

U.S. PATENT DOCUMENTS

| | | | | |
|---|---|---|---|---|
| 2,513,362 A | * | 7/1950 | Richey ......................... | 375/319 |
| 4,578,820 A | * | 3/1986 | Highton ...................... | 455/226.2 |
| 5,289,136 A | | 2/1994 | DeVeirman et al. ........ | 330/252 |
| 5,598,430 A | | 1/1997 | Hachisuka et al. .......... | 375/216 |
| 5,844,439 A | * | 12/1998 | Zortea .......................... | 327/307 |
| 5,953,643 A | * | 9/1999 | Speake et al. ............... | 455/324 |
| 6,047,031 A | * | 4/2000 | Allott et al. ................. | 375/317 |

FOREIGN PATENT DOCUMENTS

| | | |
|---|---|---|
| EP | 0 470 286 A1 | 2/1992 |
| GB | 2 240 889 A | 8/1991 |

OTHER PUBLICATIONS

*Detector For Amplitude Shift Keyed Signal*, IBM Technical Disclosure Bulletin, US, IBM Corp., New York, vol. 31, NR. 12, pp. 19–20.

* cited by examiner

Primary Examiner—Stephen Chin
Assistant Examiner—Chieh M. Fan
(74) Attorney, Agent, or Firm—Kirschstein, et al.

(57) ABSTRACT

In a detection circuit for ASK or OOK modulation, the received modulated signal is ac coupled to a dc restoration circuit and amplified. The dc restoration is carried out on signal peaks corresponding to "mark" intervals of the modulated signal. Thus data may be recovered even in the presence of high levels inband continuous interfering signals.

12 Claims, 5 Drawing Sheets

AMPLITUDE OF WANTED, a=1
AMPLITUDE OF UNWANTED, b=2

(MODULATION AT THE BEAT FREQUENCY)

M=THE MEAN OUTPUT LEVEL DURING THE *MARK* INTERVAL
S=MEAN OUTPUT LEVEL DURING THE *SPACE* INTERVAL

DATA RATE=2kb/s
NO JAMMING SIGNAL
IF    IF
MARK  SPACE  MARK fw-fi=70kHz
WITH JAMMING SIGNAL
JAM SIG BEAT    BEAT
SPACE  MARK  SPACE  MARK

NO JAMMING SIGNAL
MARK  SPACE  MARK
1.5V
0.5V

WITH JAMMING SIGNAL
SPACE  MARK  SPACE  MARK
1.5V
0.5V

NO JAMMING SIGNAL
MARK  SPACE  MARK
1.2V
0.3V

WITH JAMMING SIGNAL
MARK  SPACE  MARK

M = THE MEAN OUTPUT LEVEL DURING THE *MARK* INTERVAL
S = MEAN OUTPUT LEVEL DURING THE *SPACE* INTERVAL

DETECTION CIRCUITS

FIELD OF THE INVENTION

This invention relates to detection circuits and more particularly to circuits used to detect low level signals in the presence of interfering continuous wave (CW) signals.

BACKGROUND OF THE INVENTION

Amplitude Shift Key (ASK) or On-Off Key (OOK) modulation is commonly used in low cost RF systems for use in short range digital control or monitoring systems such as automotive Remote Keyless Entry, security sensor monitoring and garage door opening. In OOK modulation, a transmitter is switched on and off to create a data signal comprising "mark" and "space" periods. The received signal may have varying amplitudes during the "mark" periods because of variation in distance between the transmitter and receiver. In ASK modulation, the data signal may be produced by switching a transmitter between high and low amplitude outputs in which energy is transmitted during "space" periods in addition to during the "mark" periods. In some forms of ASK modulation, intermediate amplitude levels may be used to provide a non-binary code. OOK modulation may be considered to be a form of ASK modulation.

The low cost systems mentioned above are of an unlicensed category and commonly occupy narrow regions of the RF spectrum, eg. 433.92±0.875 MHZ. Since these bands are not rigorously controlled however it is highly probable that there will be high level transmissions in the vicinity which can "jam" the wanted signal, interfering to such an extent that data is not recoverable at a receiver. Such interfering signals may be derived from many types of sources, for example, from amateur radio transmissions.

Receivers used in these low cost RF systems may be Tuned Radio Frequency (TRF), super-regenerative discrete designs and superhet integrated circuit designs for example. Transmissions to be detected are typically irregular and of short duration, say less than one second.

Suitable receivers often use highly selective RF filters prior to die Low Noise Amplifier (LNA) and at IF, although their bandwidths must allow for transmission frequency tolerances in excess of ±100 kHz, with equally slack Voltage Controlled Oscillator (VCO) tolerances in the receiver for reasons of cost Data rates arc low, normally 0.4 to 5 kBits/s. Consequently, the signal bandwidth into a detector may be in the region of ±300 kHz whilst the final data bandwidth is less than 5 kHz. Data filters may be employed to reduce noise bandwidth and increase sensitivity. However, the detector, being non-frequency selective, will detect on all signals, wanted and un-wanted, in the wide IF passband, giving high risk of jamming occurring.

A number of superhet designs for these applications use Logarithmic IF amplifiers and a Received Signal Strength Indicator (Log RSSI) as a detector. It is well known that these circuits are not capable of detecting signals in the presence of CW jammers of similar RF level. However tie benefit of Log RSSI detectors is their instant response time over a very wide range of signal level, ideal for OOK signals, compared to using a linear IF amplifier with automatic gain control.

In band continuous interfering IF signals reduce the sensitivity of the RSSI detector to the wanted signal, as the output is a log function of the input RF level during the 'mark' and 'space' periods. Also during the 'mark' period such interfering IF signals produce a signal modulated at the beat frequency (fw−fj), where fw is the wanted IF signal and fj is the jamming signal. This reduces the mean level of the wanted signal after it is filtered by a data filter to the extent that, for a jamming signal at the same level or greater than the wanted signal, the output data signal is zero. FIG. 1 shows part of the beat frequency envelope during the 'mark' period of the wanted signal when the interferer is 6 dB higher in power. FIG. 2 is an explanatory diagram of the detected signal at the RSSI output of the log amplifier. Mean signal levels during "mark" and "space" periods are shown with the levels for "mark" and "space" periods being inverted when compared to the wanted signal without interferer. The modulation component V is impressed on the wanted signal and when data is present (not shown in the diagram) the "mark" and "space" amplitudes will vary with it The RSSI output is put through a data filter to reduce the noise bandwidth. However the CW jamming signal produces a beat frequency such that there is no longer a low frequency data component present, as shown in FIG. 3.

Typically systems using Log RSSI detectors arc only capable of detecting wanted signals with signal level ratios of:

$$\frac{P_{jam}}{P_{wanted}} \leq -3 \text{ dB}$$

SUMMARY OF THE INVENTION

According to die invention there is provided a detection circuit for a modulated signal having mark and space intervals comprising de restoration means for de restoring a received modulated signal such that signal peaks corresponding to mark intervals to give a dc restored signal and reject interfering signals. The signal applied to the de restoration means may undergo some processing prior to being applied to the de restoration means. The received modulated signal is ac coupled to the dc restoration means.

This invention considerably reduces the effect of beat frequencies due to jamming signals in the IF, enabling the wanted signal to be detected in the presence of a jamming signal level ratio of:

$$\frac{P_{jam}}{P_{wanted}} \leq +20 \text{ dB}$$

By using the invention, it is possible to recover a low level wanted ASK signal from CW interferer which would otherwise prevent the wanted signal from being recovered. An anti-jam ASK detection circuit in accordance with the invention may enable ASK and OOK signals to be detected in the presence of +20 dB CW jamming signals relative to the wanted "mark" level. This gives an overall improvement of +23 dB over the RSSI detector alone.

The detection circuit may also be used as the detector directly on the signal output of a linearly automatic gain controlled IF amplifier where greater performance improvement may be realised.

According to a first feature of the invention, a receiver includes a detection circuit in accordance with the invention.

According to a second feature of die invention, a system includes a transmitter for transmitting a modulated signal having mark and space intervals and a receiver incorporating a detection circuit in accordance with the invention.

BRIEF DESCRIPTION OF THE DRAWINGS

One way in which the invention may be performed is now described by way of example with the reference to the accompanying drawings in which.

DESCRIPTION OF THE PREFERRED EMBODIMENT

Figure 1:
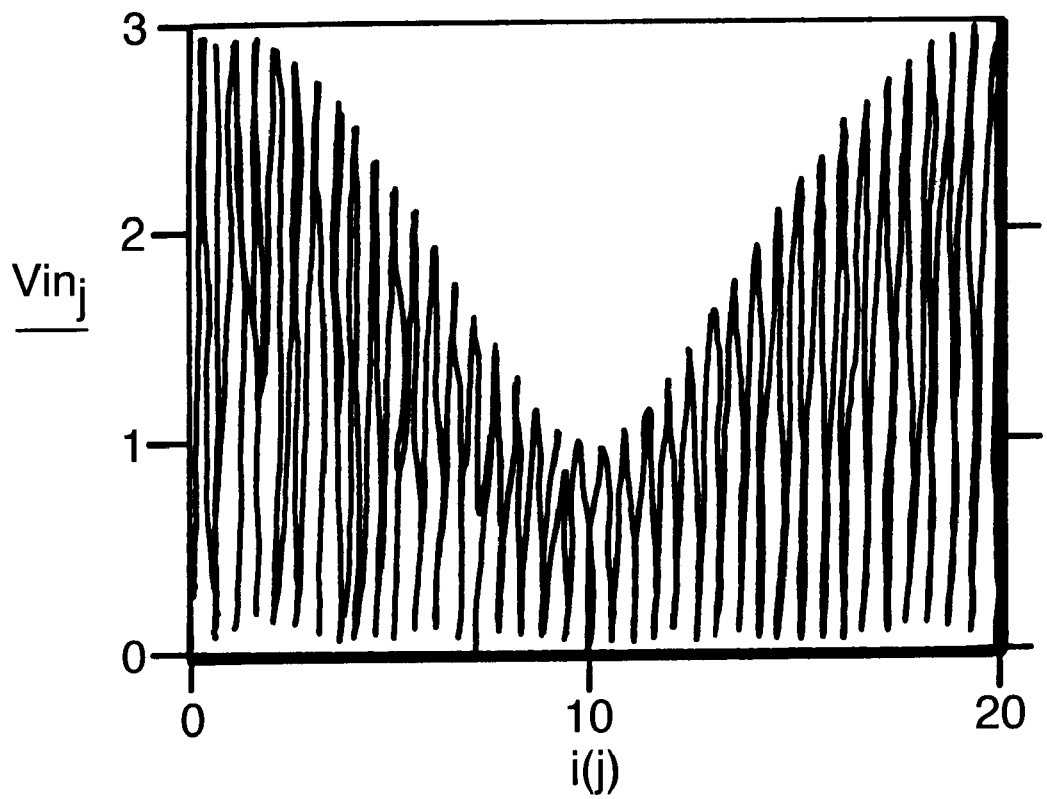
FIGS. 1, 2 and 3 are explanatory diagrams concerning the effect of interfering signals on prior art detectors.
Figure 2:
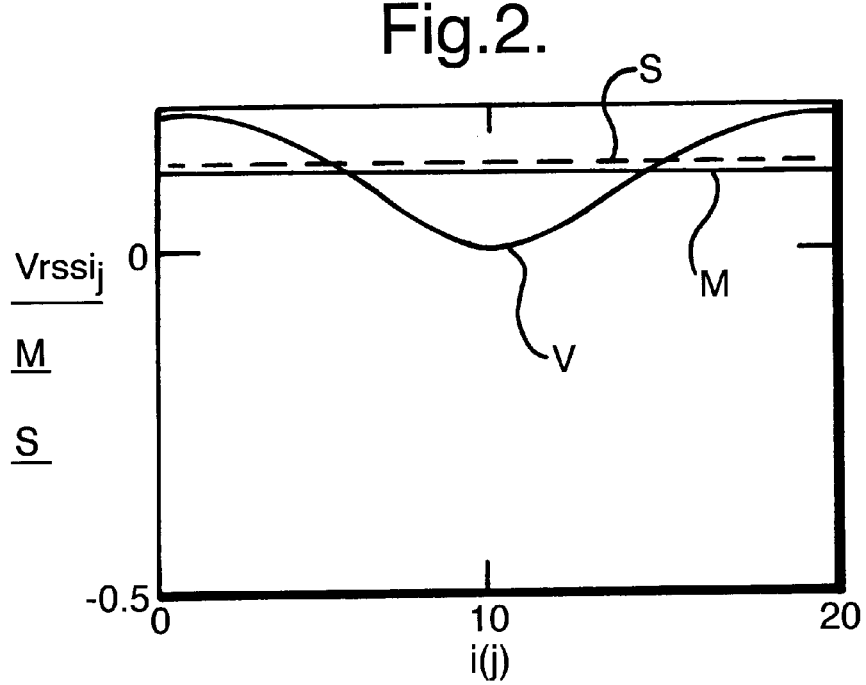
Figure 3:
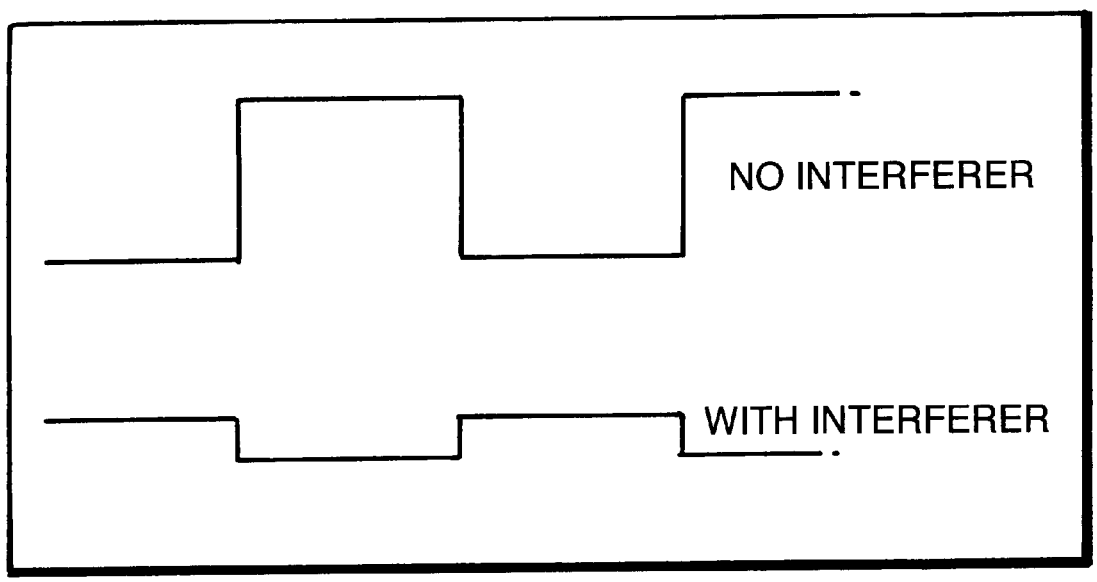
Figure 4:
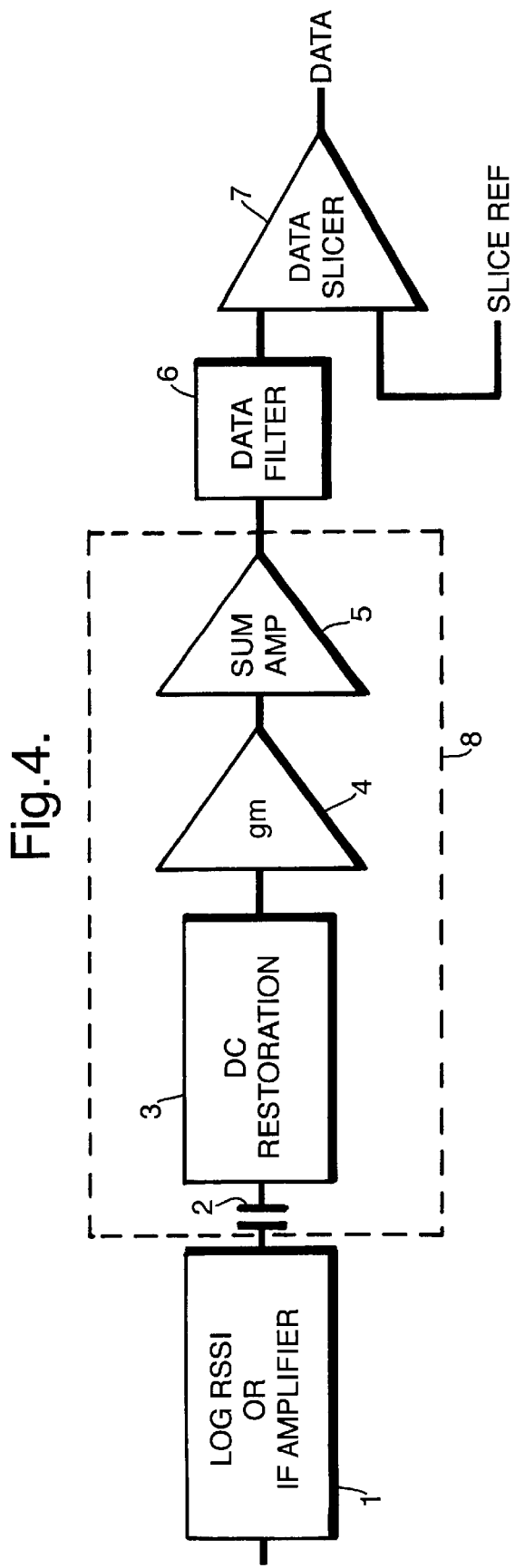
FIG. 4 is a schematic block diagram of a detector circuit in accordance with the invention.
Figure 5A:
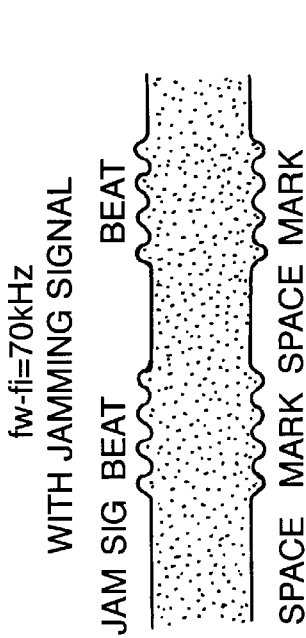
FIGS. 5(a), 5(b), 6(a), 6(b), 7, 8(a) and 8(b) are explanatory diagrams relating to the operation of the circuit shown in FIG. 4.
Figure 5B:
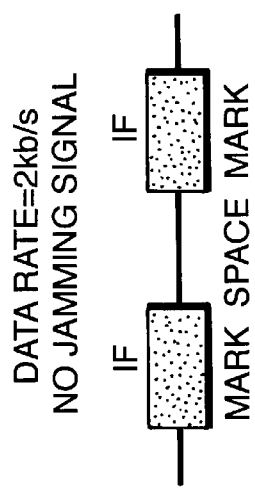
Figure 6A:
Figure 6B:

With reference to FIG. 4, a detector circuit in accordance with the invention comprises a log RSSI detector 1. An ASK modulated signal is received at the input of the amplifier. In the absence of a jamming signal, the input to the log amplifier takes the form shown in FIG. 5(a). When jamming is present however, the signal is corrupted and may appear as shown in FIG. 5(b). FIGS. 6(a) and 6(b) show the wave forms at the output of the log amp RSSI detector I in the absence and presence respectively of a jamming signal. As can be seen, the jamming signal has a considerable effect on the output signal. The output of log RSSI 1 is applied to a coupling and dc restoration capacitor 2 and to dc restoration circuit 3. The ac coupled signal at capacitor 2 is dc restored on the signal peaks defined by the higher RF level corresponding to the "mark". The lower signal which corresponds to the "space" is not used for dc restoration because of its very much lower signal to noise ratio. Following de restoration, the signal is applied to a transconductance amplifier 4 which amplifiers the peak of the signal non-linearly, such that the output current, $I_s$ is $$I_s = I_{bias} \cdot \exp\left[\frac{e}{kT}(V_{in} - V_{clamp})\right] \cdot N$$

where $I_{bias}$ is the normal dc current in the transistor with no input signal, and $(V_{in}-V_{clamp})$ is the dc restored input signal relative to the clamp level. N is a multiplying factor which is dependent on the amplitude and the mark/space ratio of the wanted signal, e is the electron charge, k is Boltzmann's constant and T is temperature in Kelvin.

The current Is from the transconductance amplifier 4 is summed at 5 with all amplifier standby current to give an output which corresponds to the amplified peaks of the signal during the "mark" period of the signal. This gives an output $V_{out}$ where $V_{out}=-R.(I_s-I_{bias})$. The resulting output signal is then applied to a data filter 6 and data slicer 7 to provide a data output signal. The capacitor 2, dc restoration circuit 3, transconductance amplifier 4 and summing amplifier 5 may be considered to form an anti-jam detection circuit 8, as indicated by a broken line in FIG. 4.

Figure 8A:
Figure 8B:
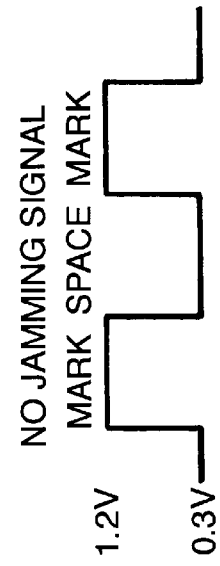
Figure 7:
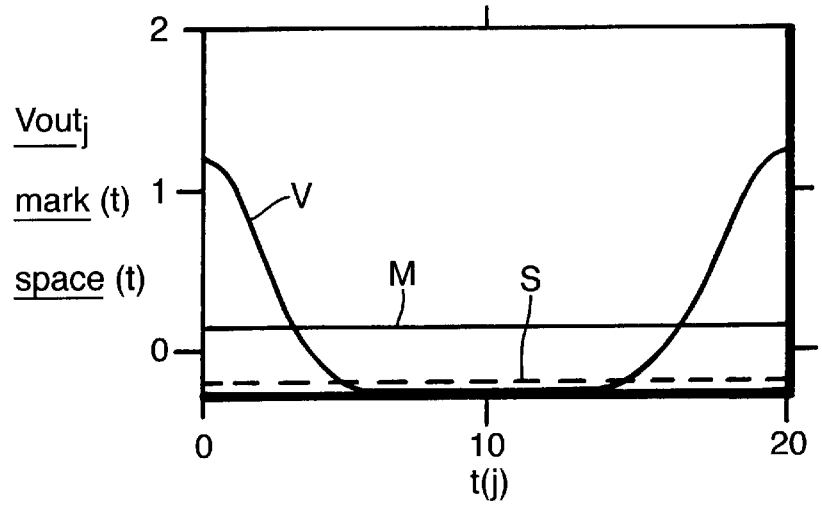

As the output signal from the summing amplifier 5 has a relatively large differential between the mean levels during the "mark" and "space" intervals of the wanted signal, the data slicer 7 is capable of slicing the signal even in the presence of CW interferers of greater than 20 dB higher. FIG. 7 illustrates the relative difference between the mean output levels of the "mark" interval and the "space" interval together with the signal V at the output of the summing amplifier 5 in the absence of data. FIGS. 8(a) and 8(b) show the output of the anti-jam circuit 8 with and without respectively a jamming signal.

Figure 9:
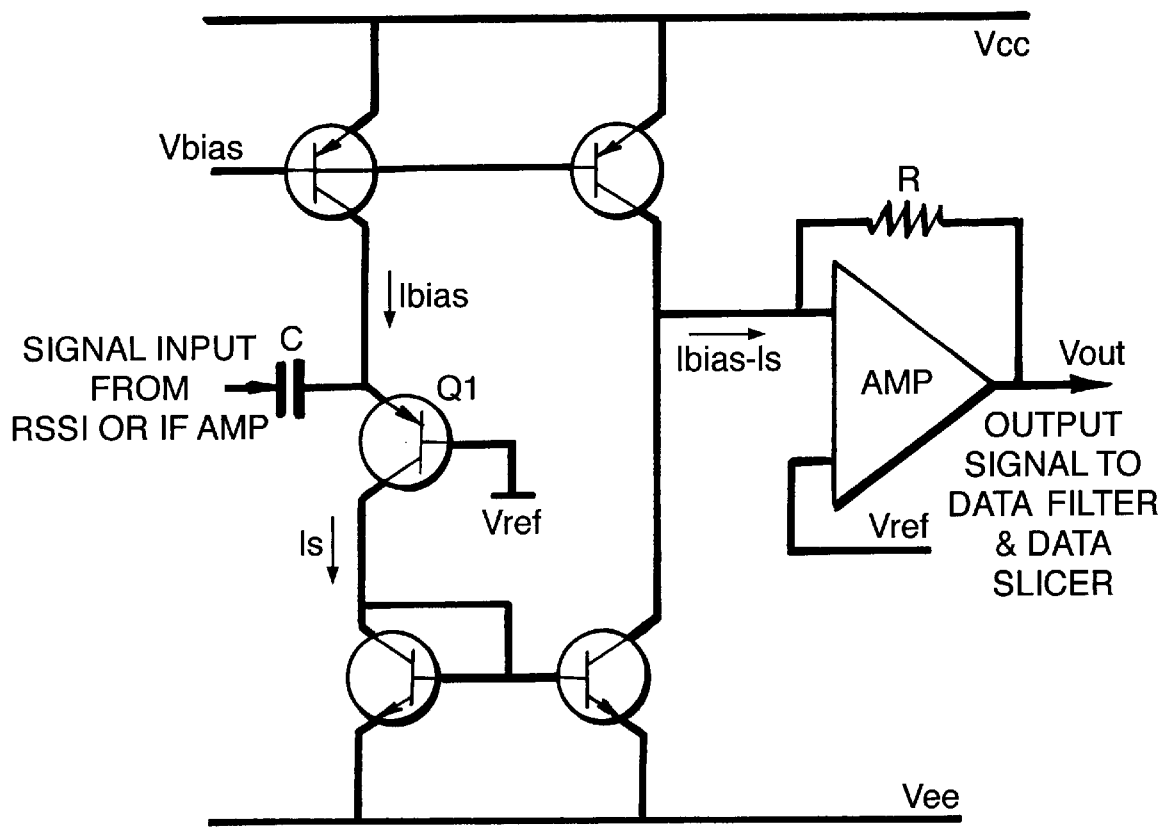
FIG. 9 is a circuit realisation of part of the arrangement shown in FIG. 4.

FIG. 9 is a circuit realisation of the arrangement shown in FIG. 4. In this circuit, a PNP Q1 serves a dual function as the dc restoration circuit, discharging the coupling capacitor C during signal peaks, and also as a non-linear high gain amplifier. The coupling capacitor C, as in many dc restoration circuits, stores the charge for the dc restoration voltage.

As described above, the signal applied to the anti-jam circuit is derived from a log RSSI 1. In other implementations, the signal applied to the anti-jam circuit may be taken from the output of an IF amplifier.

I claim:

1. A detection circuit for use with a modulated signal having mark and space intervals, the detection circuit comprising: a dc restoration circuit for dc restoring a received modulated signal on signal peaks corresponding to mark intervals to give a dc restored signal and reject interfering signals; a transconductance amplifier for amplifying said dc restored signal; and a summer for summing an output of said amplifier to give an output signal corresponding to amplified peaks of the signal during mark intervals of the received modulated signal.

2. The circuit as claimed in claim 1, and including ac coupling to the dc restoration circuit for coupling the received modulated signal thereto.

3. The circuit as claimed in claim 1, wherein said transconductance amplifier amplifies the peak of said dc restored signal non-linearly such that its output current $I_s$ is in accordance with the equation:

$$I_s = I_{bias} \cdot \exp\left[\frac{e}{kT}(V_{in} - V_{clamp})\right] \cdot N$$

where $I_{bias}$ is a nominal dc current with no input signal, $(V_{in}-V_{clamp})$ is the dc restored input signal relative to a clamp level, N is a multiplying factor, k is Boltzmann's constant, and T is the temperature in degrees Kelvin.

4. The circuit as claimed in claim 1, and including a data slicer to which said output signal is applied.

5. The circuit as claimed in claim 1, wherein a common means acts as said dc restoration circuit and as a non-linear high gain amplifier.

6. The circuit as claimed in claim 1, and including a logarithmic received signal strength indicator detector, the received modulated signal being applied to the de restoration circuit from said detector.

7. The circuit as claimed in claim 1, and including an intermediate frequency (IF) amplifier, the received modulated signal being applied to said dc restoration circuit from said IF amplifier.

8. The circuit as claimed in claim 1, wherein the modulated signal is on-off key modulated.

9. A receiver, comprising: a detection circuit for use with a modulated signal having mark and space intervals, the detection circuit including a dc restoration circuit for dc restoring a received modulated signal on signal peaks corresponding to mark intervals to give a dc restored signal, a transconductance amplifier for amplifying said dc restored signal, and a summer for summing an output of said amplifier to give an output signal corresponding to amplified peaks of the signal during mark intervals of the received modulated signal.

10. The receiver as claimed in claim 8, wherein the modulated signal is on-off key modulated.

11. An RF system, comprising: a transmitter for transmitting a modulated signal having mark and space intervals;

and a detection circuit for use with a received modulated signal, the detection circuit including a dc restoration circuit for dc restoring the received modulated signal on signal peaks corresponding to mark intervals to give a dc restored signal, a transconductance amplifier for amplifying said dc restored signal, and a summer for summing an output of said amplifier to give an output signal corresponding to amplified peaks of the signal during mark intervals of the received modulated signal.

12. The system as claimed in claim 11, wherein the modulated signal is on-off key modulated.

* * * * *